US007051864B1

(12) United States Patent
Lin

(10) Patent No.: US 7,051,864 B1
(45) Date of Patent: May 30, 2006

(54) ROLLER-GUIDED FEEDING DEVICE FOR A WOOD WORKING MACHINE

(76) Inventor: Ching-Chi Lin, No. 473, San Feng Rd., Houli Hsiang, Taichung Hsien (TW)

( * ) Notice: Subject to any disclaimer, the term of this patent is extended or adjusted under 35 U.S.C. 154(b) by 0 days.

(21) Appl. No.: 11/048,207

(22) Filed: Feb. 1, 2005

(51) Int. Cl.
*B65G 29/00* (2006.01)

(52) U.S. Cl. .................... 198/613; 198/620; 198/621.1

(58) Field of Classification Search ................ 198/604, 198/605, 613, 620, 621.1, 624, 626.1, 626.3, 198/836.1, 836.2
See application file for complete search history.

(56) References Cited

U.S. PATENT DOCUMENTS 3,866,640 A * 2/1975 Sweet et al. ................ 198/604
4,009,632 A * 3/1977 Detjen ........................ 198/604
4,143,775 A * 3/1979 Shields ....................... 198/613
5,123,522 A * 6/1992 Comly, Jr. .................. 198/613
5,676,238 A * 10/1997 Saastamo .................... 198/624
6,327,888 B1 * 12/2001 Kadlec .................... 198/621.1

* cited by examiner

*Primary Examiner*—James R. Bidwell
(74) *Attorney, Agent, or Firm*—Darby & Darby

(57) ABSTRACT

A roller-guided feeding device includes guiding rollers, an arm which is movable relative to the guiding rollers between initial and working position that are remote from and closer to the guiding rollers, respectively, and which has a feed-in roller, a pneumatic cylinder, and a piston rod connected to a piston in the cylinder. The piston rod is moved as a result of a difference in pressures in the cylinder so as to turn the arm. A servo valve member is disposed to control air flow into the cylinder so as to hold the feed-in roller at the working position and the initial position in response to a work signal from a sensor member and a start signal from a manually-operated actuator, respectively. In response to a pausing signal from the sensor member, the feed-in roller is held at a pausing position to serve as another initial position in a subsequent cutting operation.

7 Claims, 12 Drawing Sheets

ROLLER-GUIDED FEEDING DEVICE FOR A WOOD WORKING MACHINE

BACKGROUND OF THE INVENTION

1. Field of the Invention

This invention relates to a roller-guided feeding device for enabling a workpiece to move on a worktable of a wood-working machine along a feeding route, more particularly to a roller-guided feeding device with a servo valve assembly disposed to control the air flow of a stroke pneumatic operating unit for facilitating feeding of a workpiece along a feeding route.

2. Description of the Related Art

A conventional roller-guided feeding device includes a guiding unit mounted on a worktable and having a plurality of guiding rollers, a feeding unit having an arm which is pivoted relative to the guiding unit, and a feed-in roller which is rotatably mounted on one end of the arm, a pneumatic operating unit including a directional control valve which is shifted between closed and open positions by virtue of an air pressure from an air pressure source, a pneumatic cylinder and a piston rod which are disposed downstream of the control valve and which are connected to the end of the arm, and a manually operated actuator. When the actuator is operated to shift the control valve to the open position, the piston rod is moved by the air pressure to turn the end of the arm closer to the guiding rollers so as to feed a workpiece forward along a feeding route defined by the guiding rollers and the feed-in roller while holding the workpiece in place.

However, during the feeding operation, the user needs to operate the actuator with one hand or foot so as to maintain the control valve in the open position, which is inconvenient. Moreover, after a part of the workpiece is cut, the actuator has to be released to return the control valve to the closed position so as to permit outward turning of the arm for subsequent cutting of the remaining part of the workpiece, which is also inconvenient.

SUMMARY OF THE INVENTION

The object of the present invention is to provide a roller-guided feeding device which has a stroke pneumatic operating unit that can turn an arm to a desired position without the need for manual operation so as to facilitate the feeding operation.

According to this invention, the roller-guided feeding device includes a guiding unit, a feeding unit and a stroke pneumatic operating unit. The feeding unit has a stationary support adapted to be mounted on a worktable, and a plurality of guiding rollers rotatable relative to the stationary support and displaced from one another along a feeding route. The feeding unit includes an arm which has a carrying end disposed to be movable between initial and working positions that are remote from and closer to the guiding rollers, respectively, and a feed-in roller which is mounted on and which is rotatable to the carrying end such that in the working position, the workpiece is moved forward along the feeding route by rotation of the feed-in roller while being guided by the guiding rollers. The stroke pneumatic operating unit includes an air pressure source, a pneumatic cylinder having a piston driven by an air pressure, and a head-side pressure chamber and a rod-side pressure chamber respectively formed on two opposite sides of the piston, and a piston rod connected to the piston. One of the piston rod and the cylinder is connected to the carrying end of the arm such that when the piston rod is moved forward as a result of higher pressure in the head-side pressure chamber than in the rod-side pressure, the feed-in roller is moved toward the working position, and when the piston rod is moved rearward as a result of higher pressure in the rod-side pressure chamber than in the head-side pressure chamber, the feed-in roller is moved toward the initial position. A servo valve assembly is disposed to control flow of air from the air pressure source into the head-side pressure chamber and the rod-side pressure chamber such that, in response to a work signal, pressure in the head-side pressure chamber is controlled to be higher than that in the rod-side pressure chamber to enable the feed-in roller to be held at the working position, such that, in response to a start signal, pressures in the rod-side pressure chamber is controlled to be higher that that in the head-side pressure chamber to enable the feed-in roller to be held at the initial position, and such that, in response to a pause signal, the pressures in both the head-side and rod-side pressure chambers are controlled to be equal to enable the feed-in roller to be held at a pausing position which is located between the initial position and the working position, and which serves as another initial position when the servo valve assembly is activated by another work signal. An actuator is disposed to send the start signal to the servo valve assembly. A sensor member is disposed to send the work signal and the pause signal to the servo valve assembly in response to starting of a feed-in course and ending of a feed-out course of the workpiece, respectively.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
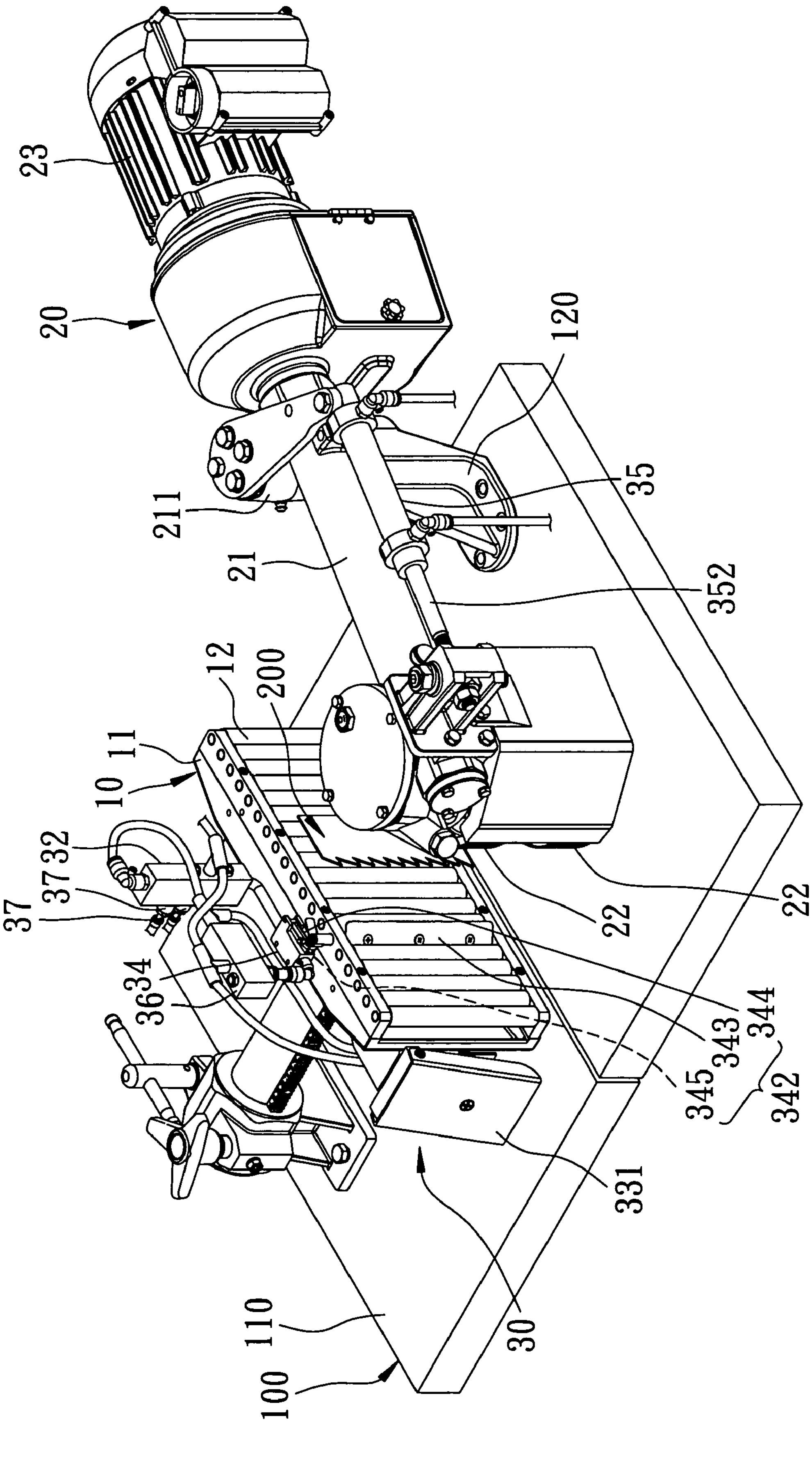
FIG. 1 is a perspective view of the preferred embodiment of a roller-guided feeding device according to this invention.
Figure 2:
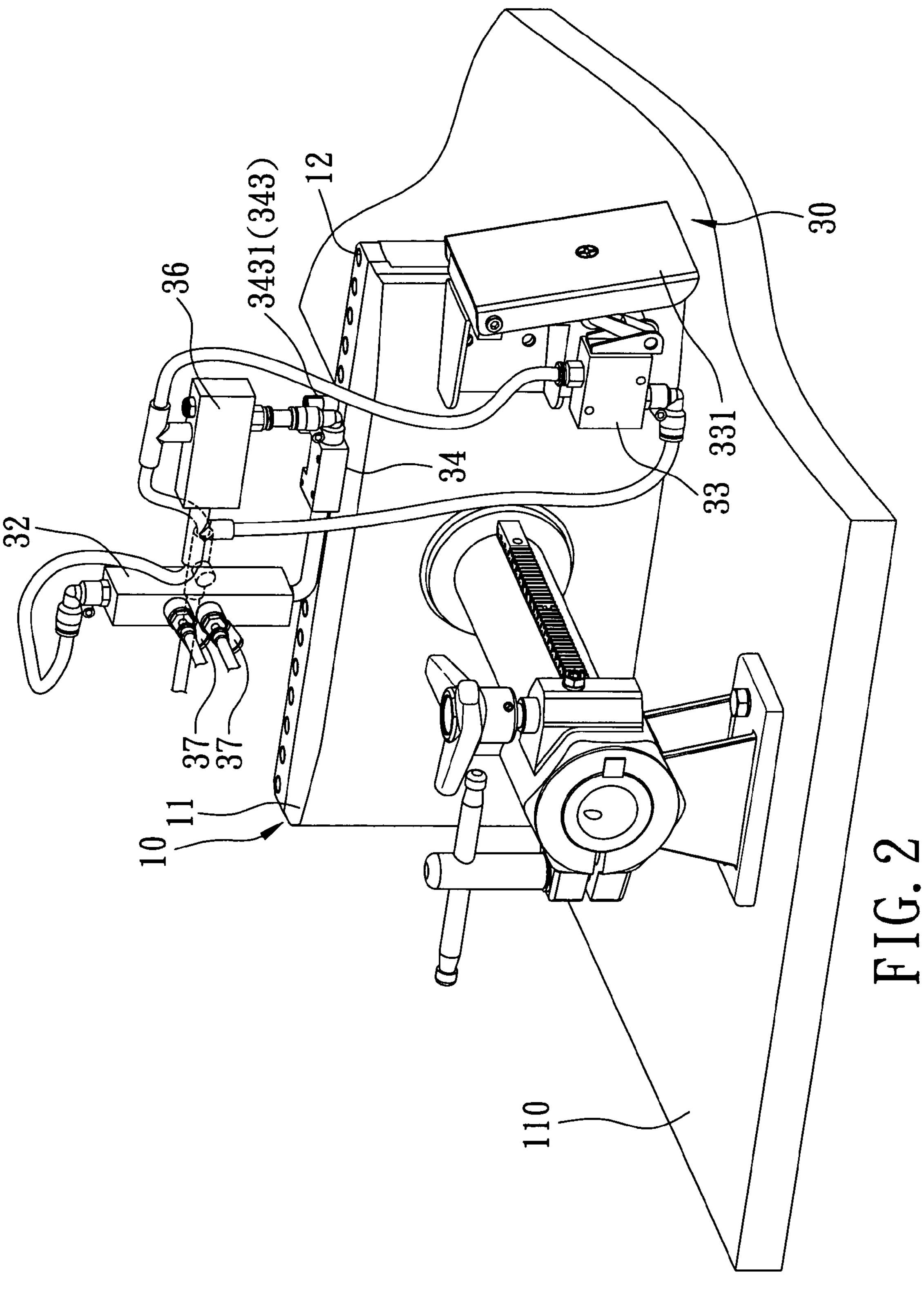
FIG. 2 is a fragmentary perspective view of a guiding unit and a servo valve assembly of the preferred embodiment.
Figure 3:
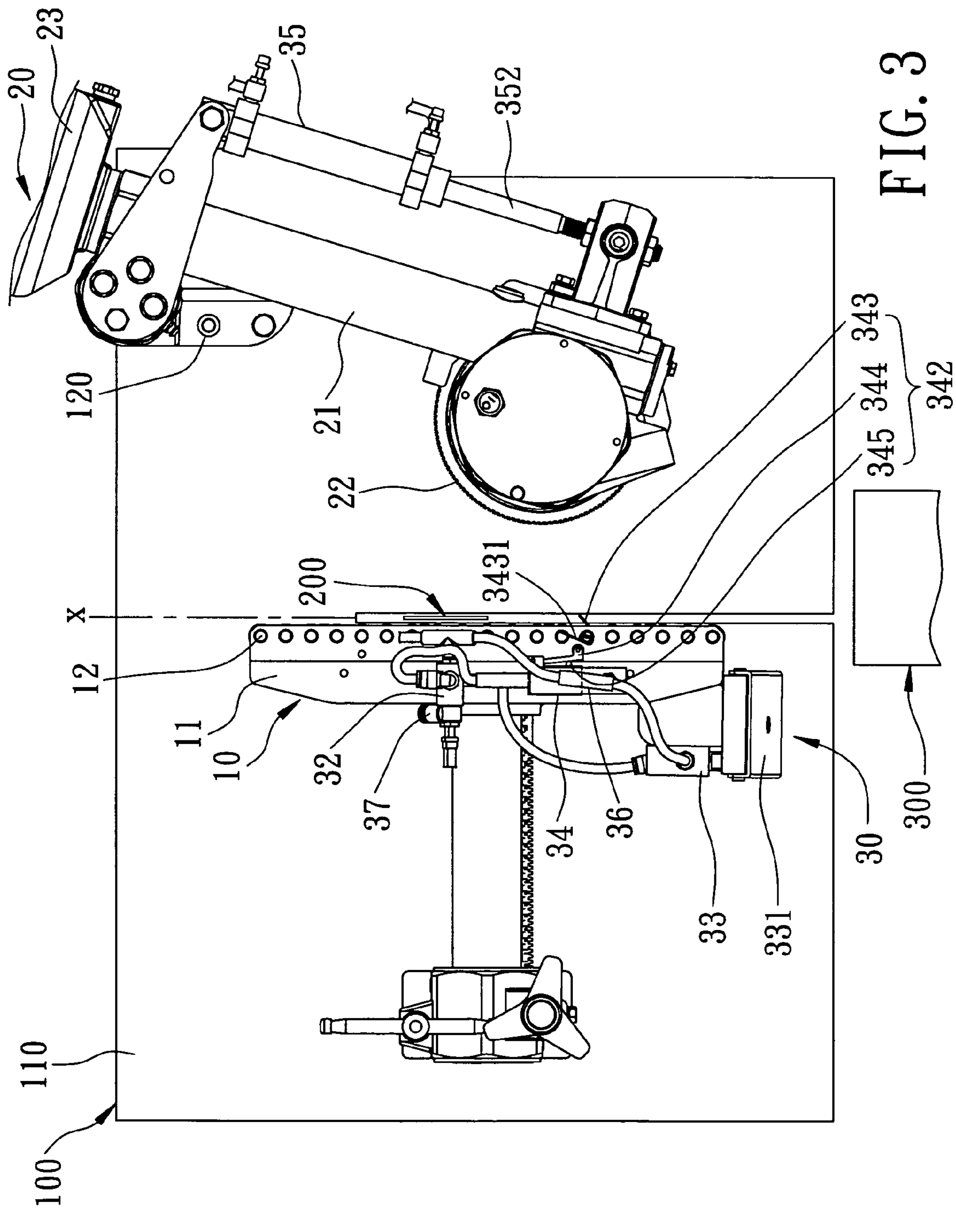
FIG. 3 is a top view of the preferred embodiment.
Figure 4:
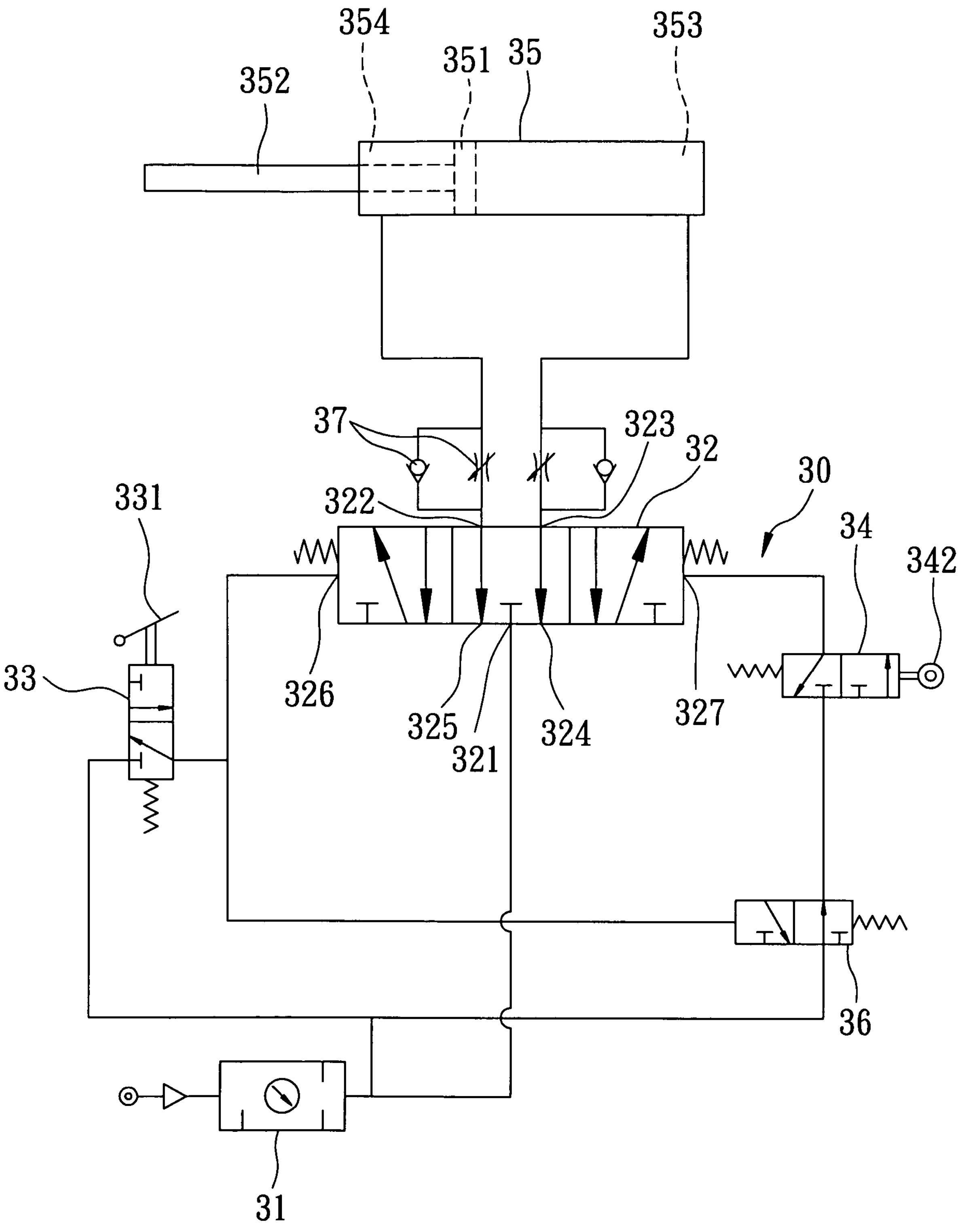
FIG. 4 is a schematic view showing an arrangement of a stroke pneumatic operating unit, an air pressure source, and the servo valve assembly of the preferred embodiment.

Referring to FIGS. 1 to 4, the preferred embodiment of a roller-guided feeding device according to the present invention is shown to comprise a guiding unit 10, a feeding unit 20, and a stroke pneumatic operating unit 30.

The guiding unit 10 has a stationary support 11 adapted to be mounted on a worktable 110 of a wood working machine 100, such as a wood sawing machine, and a plurality of guiding rollers 12 which extend in an upright direction, which are rotatable relative to the stationary support 11, and which are displaced from one another along a feeding route (x). The wood sawing machine has a saw blade 200 for cutting a workpiece 300 fed along the feeding route (x).

The feeding unit 20 includes an arm 21 which has a coupling end and a carrying end opposite to each other, two feed-in rollers 22 which are mounted on and which are rotatable relative to the carrying end of the arm 21 about an axis in the upright direction, and a driving motor 23 which is mounted on the coupling end of the arm 21 to provide a drive that is transmitted through the coupling end so as to drive the feed-in rollers 22. The arm 21 further has a pivot lug 211 which is pivotally mounted on an upright post 120 secured on the worktable 110 such that the carrying end is movable between a first one of initial positions that is remote from the guiding rollers 12 (see FIG. 6), and a working position that is closer to the guiding rollers 12 (see FIG. 8). Hence, in the working position, a workpiece 300 can be moved forward along the feeding route by rotation of the feed-in rollers 22 while being guided by the guiding rollers 12.

The stroke pneumatic operating unit 30 includes an air pressure source 31, a pneumatic cylinder 35, a piston rod 352, a servo valve assembly, an actuator 331, and a sensor member 342.

The pneumatic cylinder 35 has a piston 351 driven by an air pressure, and a head-side pressure chamber 353 and a rod-side pressure chamber 354 respectively formed on two opposite sides of the piston 351. The piston rod 352 has an end connected to the piston 351, and an opposite end connected to the carrying end of the arm 21 such that when the piston rod 352 is moved forward as a result of higher pressure in the head-side pressure chamber 353 than in the rod-side pressure 354, the carrying end of the arm 21 and the feed-in rollers 22 are moved toward the working position, and when the piston rod 352 is moved rearward as a result of higher pressure in the rod-side pressure chamber 354 than in the head-side pressure chamber 353, the carrying end of the arm 21 and the feed-in rollers 22 are moved toward the first one of the initial positions.

The servo valve assembly includes a three-position first valve 32, a two-position second valve 33, a two-position third valve 34, and a two-position fourth valve 36.

The first valve 32 has first and second outlet ports 322, 323 which are respectively communicated with the rod-side pressure chamber 354 and the head-side pressure chamber 353 through two speed control members 37, such as speed control valves, respectively, so as to control the speed of flow of compressed air into the rod-side pressure chamber 354 and the head-side pressure chamber 353, respectively. The first valve 32 further has an intake port 321 disposed downstream of the air pressure source 31, two exhaust ports 324, 325, and first and second guiding ports 326, 327. The first valve 32 is shiftable by an air pressure among a first position (see FIG. 5), where compressed air from the air pressure source 31 is supplied to the rod-side pressure chamber 354 through the first outlet port 322 so as to move the piston rod 352 rearward to thereby move the feed-in rollers 22 toward the first one of the initial positions, a second position (see FIG. 9), where compressed air from the air pressure source 31 is supplied to the head-side pressure chamber 353 through the second outlet port 323 so as to move the piston rod 352 forward to thereby move the feed-in rollers 22 toward the working position, and a middle position that is located between the first and second positions (see FIG. 4), where supply of compressed air from the air pressure source 31 is interrupted so as to hold the feed-in rollers 22 at a pausing position, which is located between the first initial position and the working position.

The second valve 33 is disposed downstream of the air pressure source 31 and upstream of the first guiding port 326 of the first valve 32, and is configured to be shifted, in response to a start signal from the actuator 331, from a non-communicating position, where supply of compressed air from the air pressure source 31 to the first outlet port 322 is cut off, to a communicating position, where the supply of compressed air to the first outlet port 322 is resumed so as to shift the first valve 32 to the first position.

The third valve 34 is disposed downstream of the air pressure source 31 and upstream of second guiding port 327 of the first valve 32, and is shifted, in response to a signal from the sensor member 342, to a communicating position, where compressed air from the air pressure source 31 is supplied to the second outlet port 323 so as to shift the first valve 32 to the second position, or a non-communicating position, where supply of the compressed air to the second outlet port 323 is cut off.

The fourth valve 36 is disposed downstream of the air pressure source 31 and upstream of the third valve 34, and is disposed downstream of the second valve 33 to take up the compressed air therefrom so that the fourth valve 36 is shifted by the compressed air from an open position, where the supply of the compressed air from the air pressure source 31 through the third valve 34 is maintained to thereby keep the first valve 32 in the second position, to a closed position, where the supply of the compressed air through the third valve 34 is cut off so as not to alter the state of the first valve 32, which is in the first position.

The actuator 331 includes a press plate which is mounted adjacent to the stationary support 11 and which is manually operable.

The sensor member 342 includes a contact plate 343 which has a pivot end mounted on the stationary support 11 and a contact end 3431 turnable to a pressed position in response to the starting of the feed-in course of the workpiece 300, and to a relieved position in response to the ending of the feed-out course of a workpiece 300, a press rod 344 which is connected to the contact plate 343, and a switch 345 which is actuated by the contact end 3431 of the contact plate 343 through the press rod 344 to send a work signal corresponding to the pressed position of the contact end 3431 to the second valve 34, and a pause signal corresponding to the relieved position of the contact end 3431 to the second valve 34.

Figure 5:
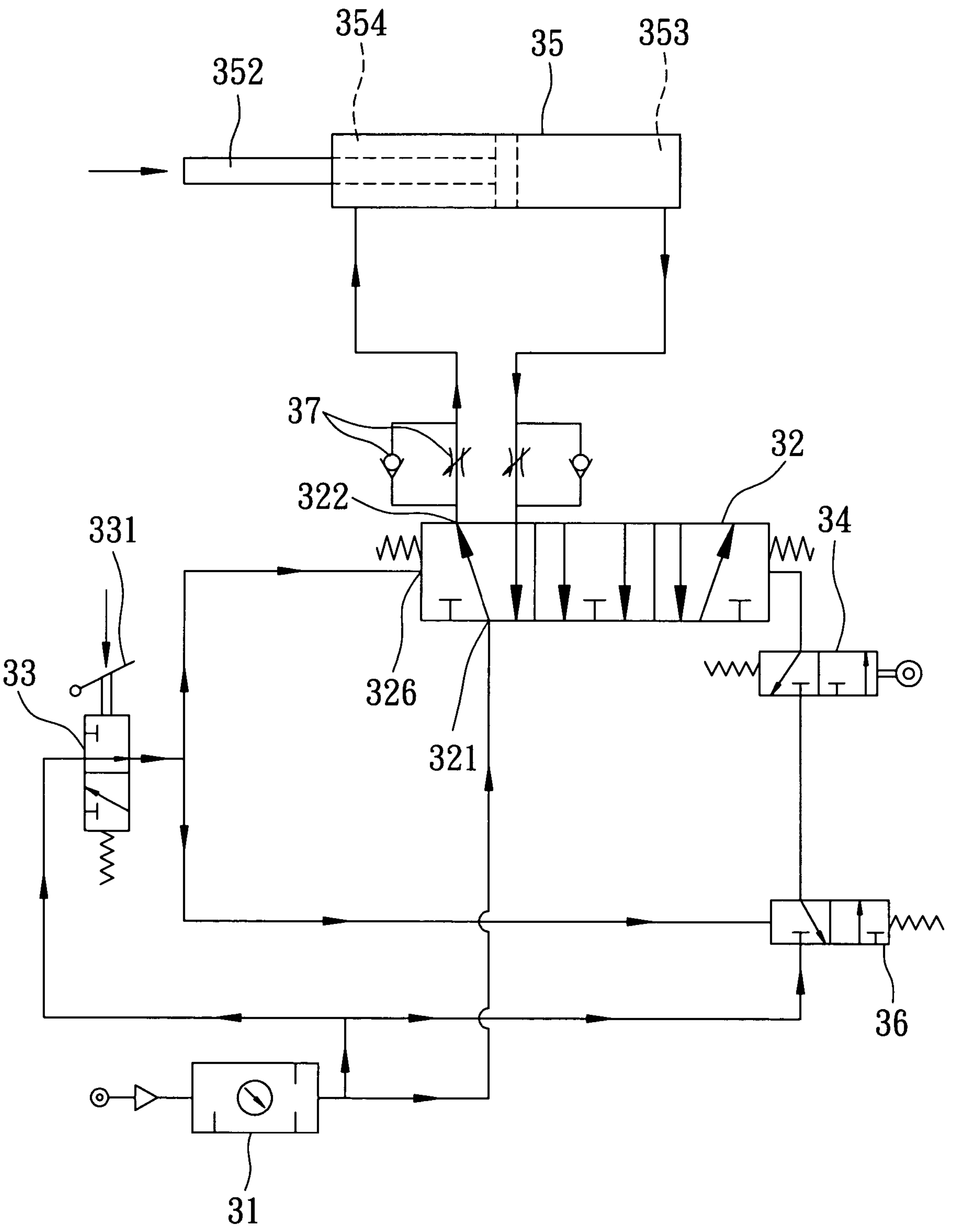
FIG. 5 is a view similar to FIG. 4 but showing a three-position first valve of the servo valve assembly in a first position.
Figure 6:
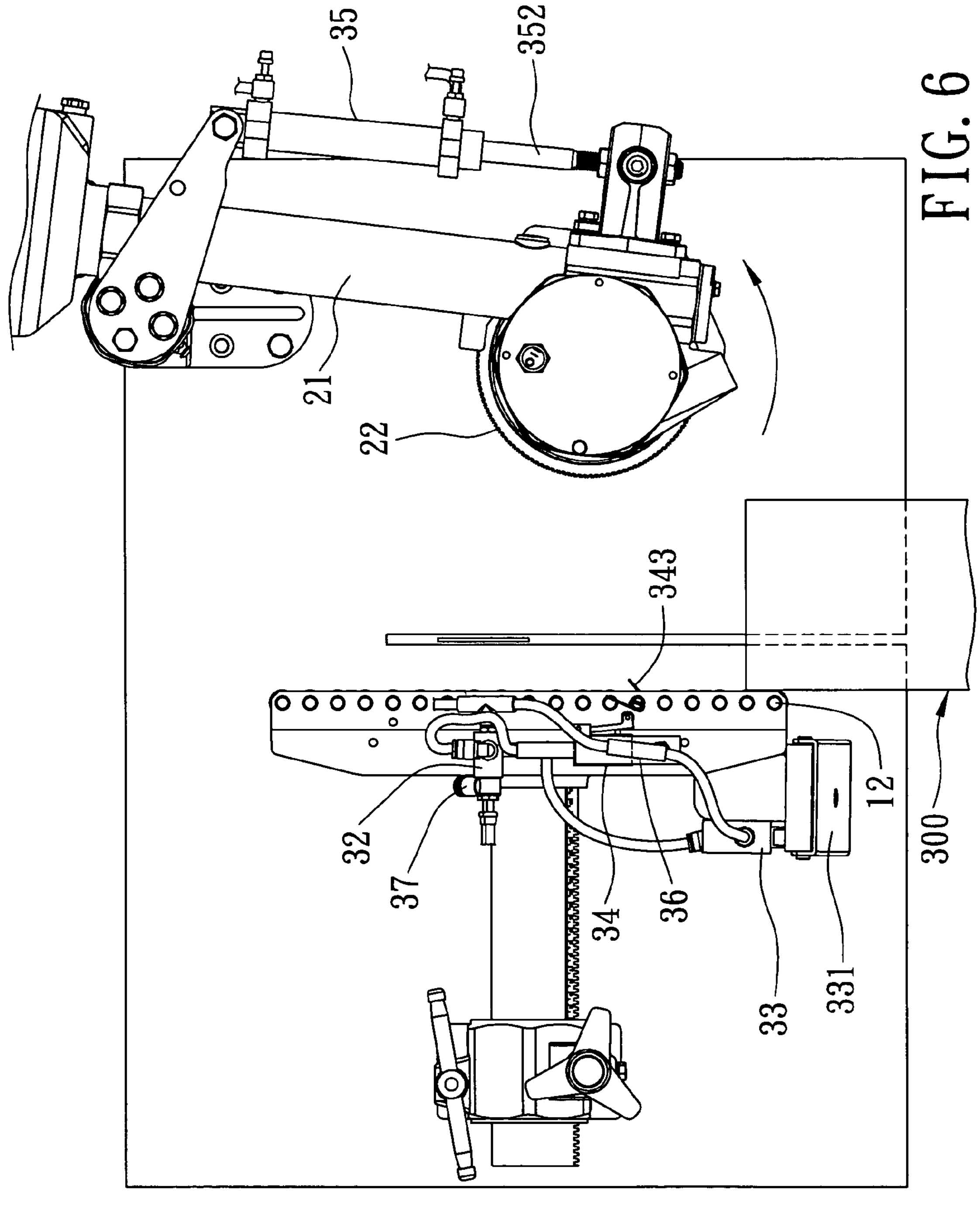
FIG. 6 is a top view of the preferred embodiment showing an arm in an initial position.

In use, referring to FIGS. 5 and 6, the user first presses the press plate of the actuator 331 to send a start signal to the second valve 33 so as to shift the latter to the communicating position. Thus, compressed air from the air pressure source 31 is allowed to flow through the second valve 33 to shift the first valve 32 to the first position such that compressed air can be supplied from the air pressure source 31 to the rod-side pressure chamber 354 so as to increase the air pressure therein. Therefore, the piston rod 352 is moved rearward such that the feed-in rollers 22 are moved toward the first initial position, i.e. remote from the guiding rollers 12. At the same time, the fourth valve 36 is shifted to the closed position by the compressed air from the second valve 33 so as to cut off the supply of compressed air through the third valve 34.

Figure 7:
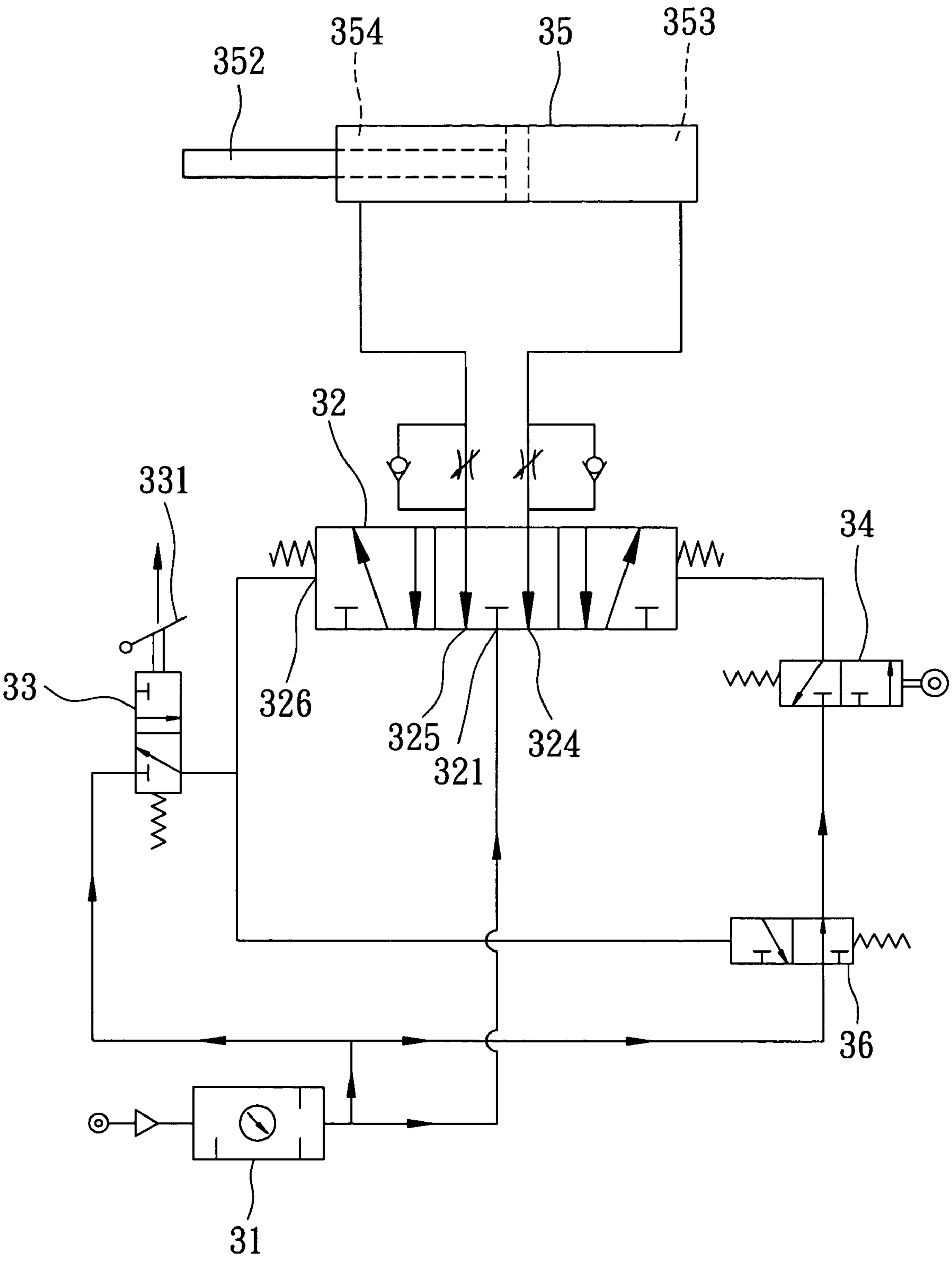
FIG. 7 is a view similar to FIG. 5 but showing that a two-position second valve of the servo valve assembly is in a non-communicating position, and a two-position fourth valve of the servo valve assembly is in an open position.

After the feed-in rollers 22 are moved a sufficient distance to place the workpiece 300 between the guiding rollers 12 and the feed-in rollers 22, the actuator 331 is released to shift the second valve 33 to the non-communicating position, as shown in FIG. 7. In this state, the pressures in both the head-side and rod-side pressure chambers 353, 354 are controlled to be equal such that the first valve 32 is returned to the middle position to hold the piston rod 352 in place and such that the feed-in rollers 22 are held at the pausing position. Moreover, the third valve 36 is returned to the open position to maintain the supply of compressed air from the air pressure source 31 through the third valve 34.

Figure 8:
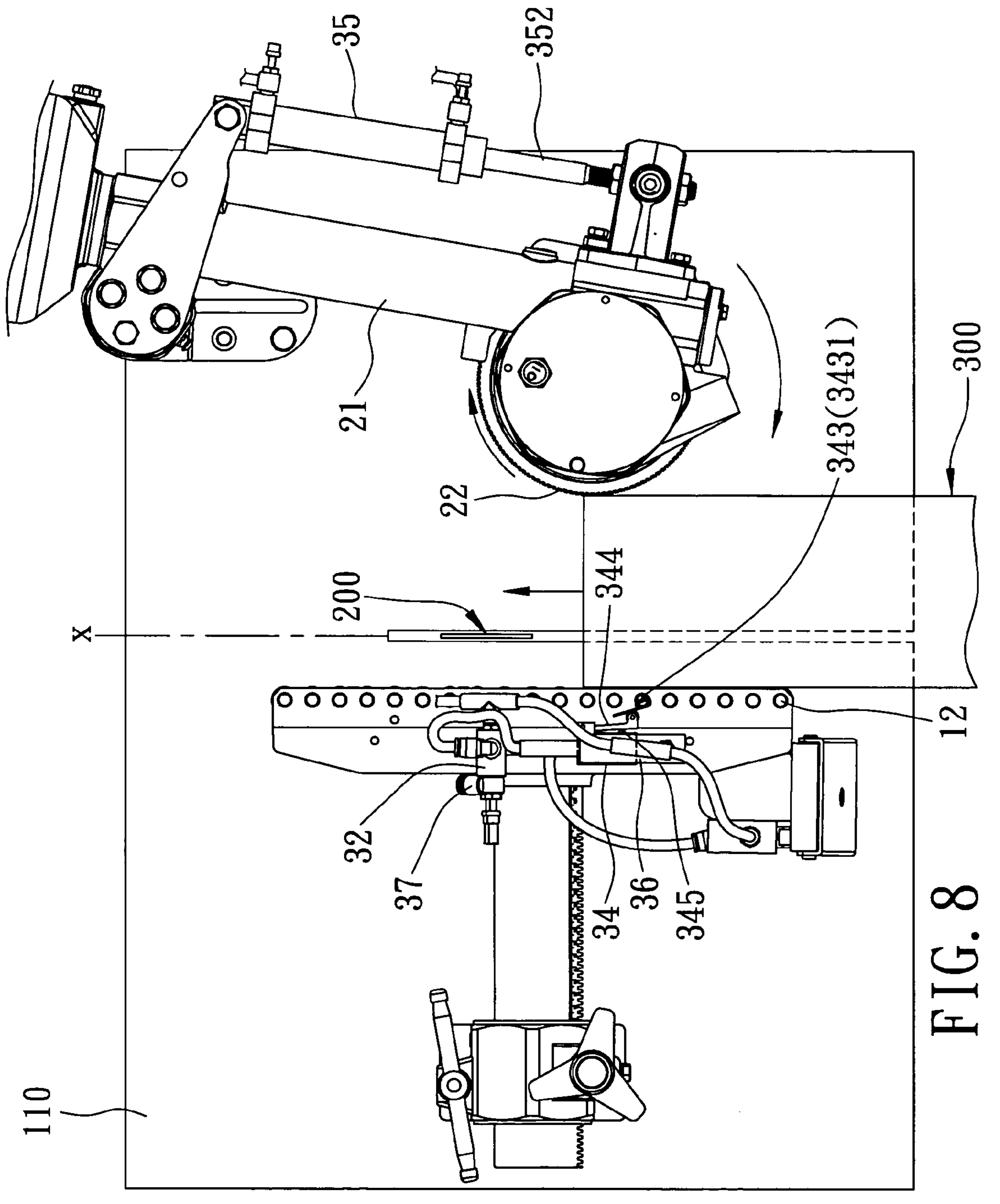
FIG. 8 is a top view of the preferred embodiment showing the arm in a working position.
Figure 9:
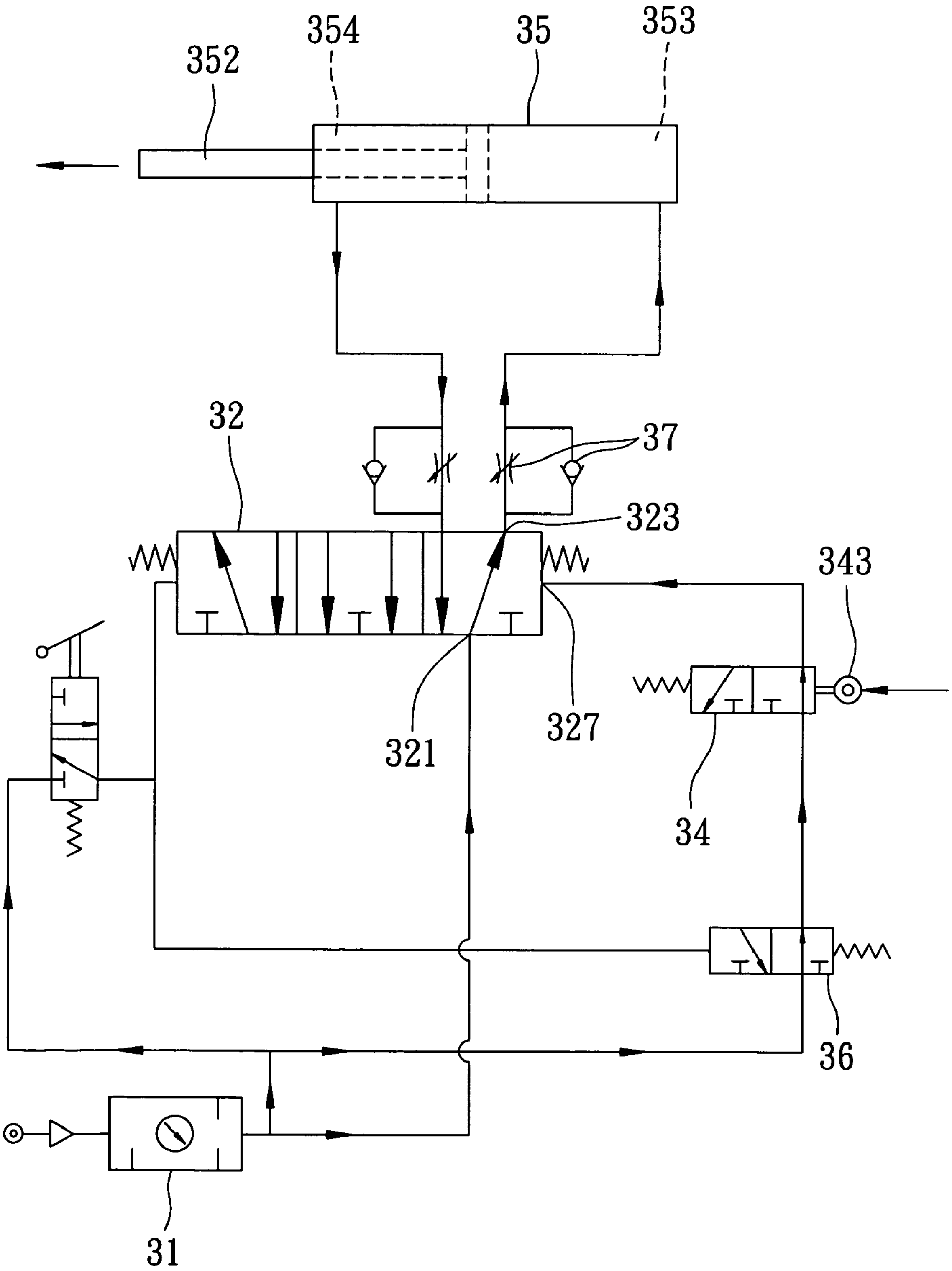
FIG. 9 is a view similar to FIG. 5 but showing that a two-position third valve of the servo valve assembly is in a communicating position, whereas the first valve is in a second position.
Figure 10:
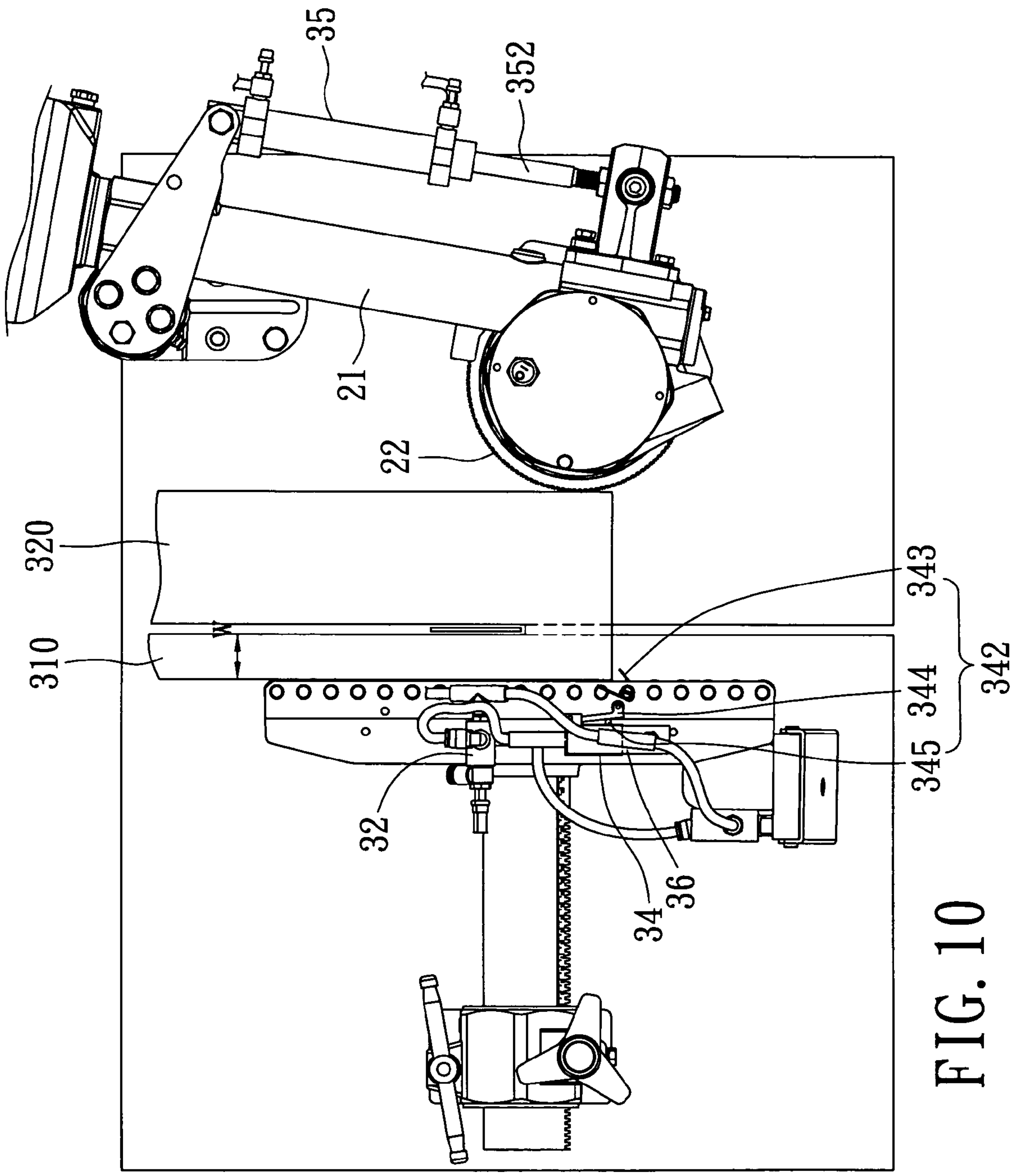
FIG. 10 is a top view of the preferred embodiment showing a workpiece at the end of a feed-out course.

Subsequently, referring to FIGS. 8 and 9, when the workpiece 300 is placed on the worktable 110 to contact the contact end 3431 of the contact plate 343, the switch 345 is actuated to send a work signal to the third valve 34 so as to shift the third valve 34 to the communicating position. In this state, compressed air from the air pressure source 31 is allowed to flow through the third valve 34 to shift the first valve 32 to the second position such that compressed air can be supplied from the air pressure source 31 to the head-side pressure chamber 353 so as to increase the air pressure therein. Thus, the piston rod 352 is moved forward such that the feed-in rollers 22 are moved toward the working position, i.e. closer to the guiding rollers 12. Hence, the workpiece 300 can be moved forward along the feeding route by the feed-in rollers 22 in the feed-in and feed-out course while being guided by the guiding rollers 12. Referring to FIG. 10, the workpiece 300 is cut by the sawing blade 200 into a first part 310 and a second part 320.

Figure 11:
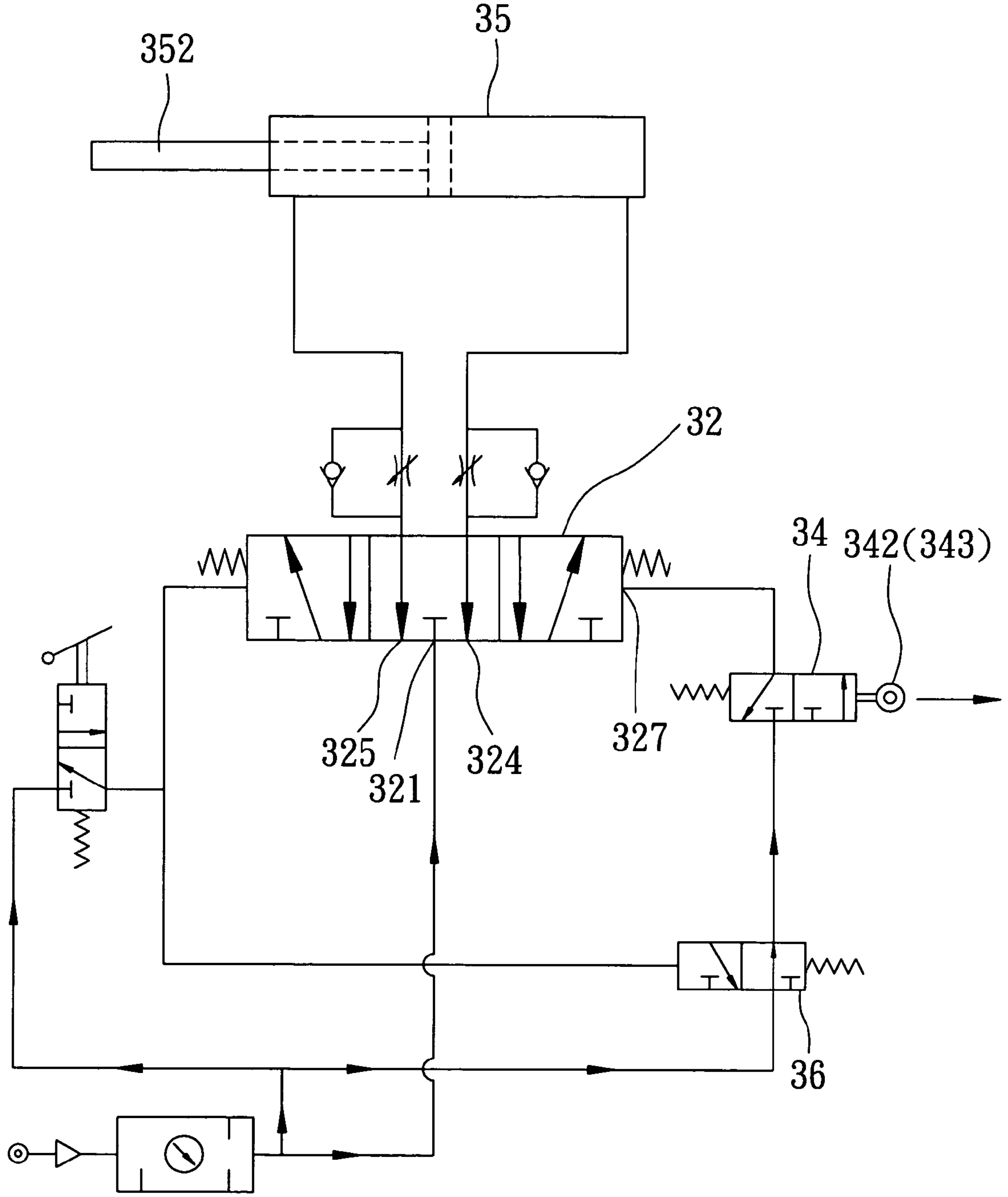
FIG. 11 is a view similar to FIG. 5 but showing that the third valve is in a non-communicating position, whereas the first valve is in a middle position.

At the end of the feed-out course, referring to FIG. 11, the sensor member 342 is released to send a pause signal to shift the third valve 34 to the non-communicating position so as to shift the first valve 32 to the middle position. In this state, the piston rod 352 is held in place such that the feed-in rollers 22 are held at the pausing position, which can then serve as a second initial position.

Figure 12:
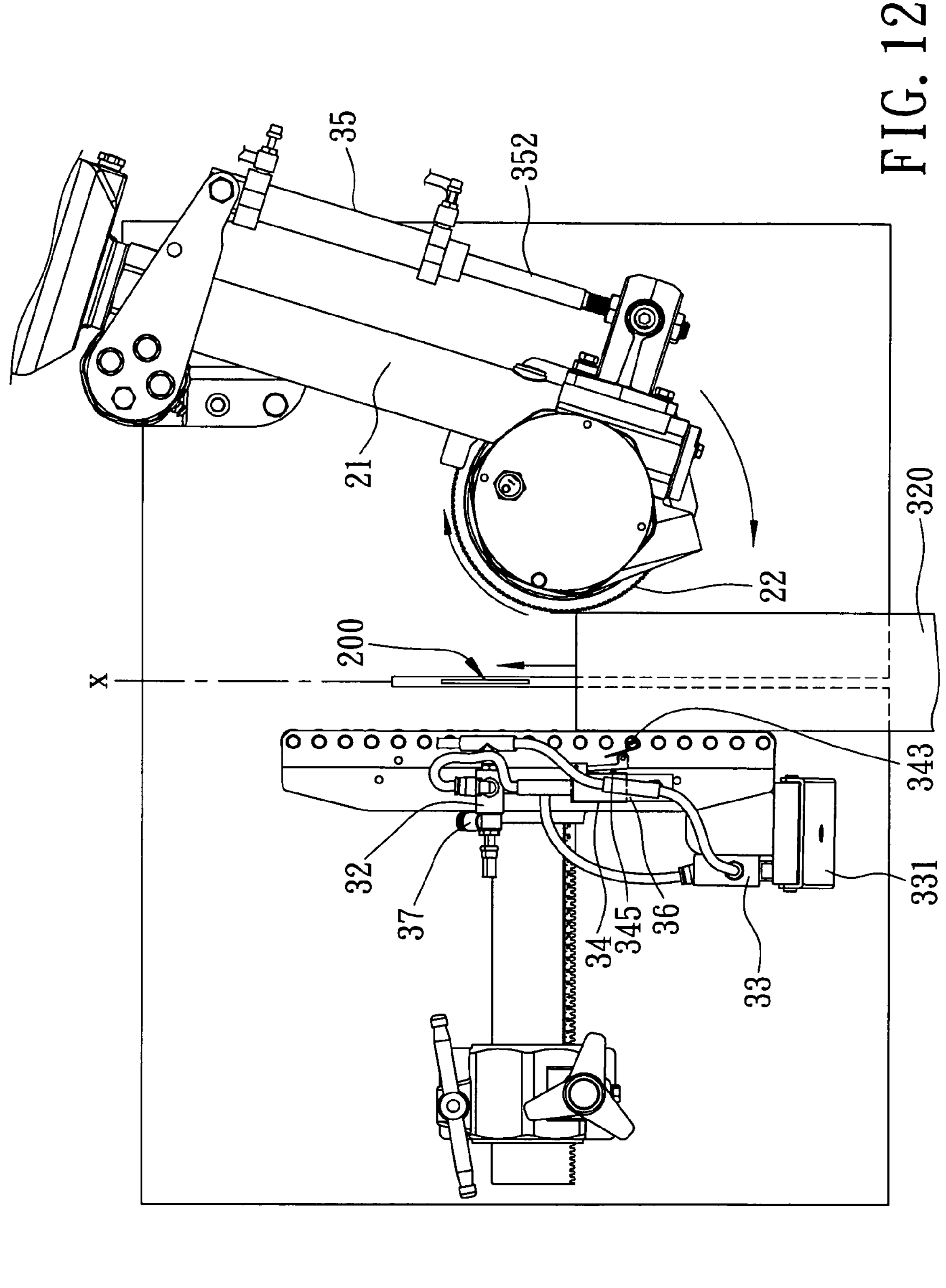
FIG. 12 is a top view of the preferred embodiment showing a remaining part of the workpiece at the start of a feed-in course.

Thereafter, referring to FIG. 12, when the second part 320 of the workpiece 300 is to be cut, the feeding operation is resumed. The contact plate 343 is brought into contact with the second part 320 to cause the switch 345 to send another work signal such that the feed-in rollers 22 are moved from the second initial position to the working position to be closer to the guiding rollers 12. In this manner, the workpiece 300 can be fed along the feeding route and can be cut into sections without the need to manually operate the actuator 331.

As illustrated, according to this invention, the feeding operation of a workpiece 300 is convenient to conduct since the feed-in rollers 22 can be moved to and maintained at any desired position. Moreover, during the feeding operation, the workpiece 300 is fed through rotation of the feed-in rollers 22 while being guided by the guiding rollers 12. In addition, once the workpiece 300 contacts the contact plate 343 of the sensor member 342 in the feed-in course, the workpiece 300 can be held in place without the user pressing the actuator 331. Furthermore, after the workpiece 300 is cut into two parts, by merely placing the second part 320 on the feeding route and by contacting the same with the sensor member 342, the feed-in rollers 22 can be moved to the working position to start feeding the second part 320 for a subsequent cutting operation.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A roller-guided feeding device for enabling a workpiece to move on a worktable of a wood working machine along a feeding route in feed-in and feed-out courses, respectively, said feeding device comprising:

a guiding unit having a stationary support adapted to be mounted on the worktable, and a plurality of guiding rollers which extend in an upright direction transverse to the feeding route, which are rotatable relative to said stationary support, and which are displaced from one another along the feeding route;

a feeding unit including an arm which has a coupling end and a carrying end opposite to each other, said carrying end being disposed to be movable between a first one of initial positions that is remote from said guiding rollers, and a working position that is closer to said guiding rollers, and a feed-in roller which is mounted on and which is rotatable relative to said carrying end about an axis in the upright direction, and which is driven by a drive that is transmitted through said coupling end to rotate about the axis such that in the working position, the workpiece is moved forward along the feeding route by rotation of said feed-in roller while being guided by said guiding rollers; and a stroke pneumatic operating unit including a pneumatic cylinder having a piston driven by air pressure, and a head-side pressure chamber and a rod-side pressure chamber respectively formed on two opposite sides of said piston, a piston rod having a proximate end connected to said piston, and a distal end opposite to said proximate end, one of said distal end and said pneumatic cylinder being connected to said carrying end of said arm such that when said piston rod is moved forward as a result of higher pressure in said head-side pressure chamber than in said rod-side pressure chamber, said feed-in roller is moved toward the working position, and when said piston rod is moved rearward as a result of higher pressure in said rod-side pressure chamber than in said head-side pressure chamber, said feed-in roller is moved toward the first one of the initial positions, an air pressure source, a servo valve assembly disposed to control flow of air from said air pressure source into said head-side pressure chamber and said rod-side pressure chamber such that, in response to a work signal, pressure in said head-side pressure chamber is controlled to be higher than that in said rod-side pressure chamber to enable said feed-in roller to be held at the working position, such that in response to a start signal, pressure in said rod-side pressure chamber is controlled to be higher than that in said head-side pressure chamber to enable said feed-in roller to be held at the first one of initial positions, and such that, in response to a pause signal, the pressures both in said head-side and rod-side pressure chambers are controlled to be equal to enable said feed-in roller to be held at a pausing position which is located between the first initial position and the working position, and which serves as a second one of the initial positions when said servo valve assembly is activated by another work signal, an actuator disposed to send the start signal to said servo valve assembly, and a sensor member disposed along the feeding route to send the work signal to said servo valve assembly in response to starting of the feed-in course, and to send the pause signal to said servo valve assembly in response to ending of the feed-out course.

2. The roller-guided feeding device of claim 1, wherein said servo valve assembly includes a three-position first valve which has first and second outlet ports that are communicated with said rod-side pressure chamber and said head-side pressure chamber, respectively, and which is configured to be shiftable by an air pressure among a first position, where compressed air from said air pressure source is supplied to said rod-side pressure chamber through said first outlet port so as to move said piston rod rearward to thereby move said feed-in roller toward the first one of the initial positions, a second position, where compressed air from said air pressure source is supplied to said head-side pressure chamber through said second outlet port so as to move said piston rod forward to thereby move said feed-in roller toward the working position, and a middle position that is located between the first and second positions, where compressed air from said air pressure source is interrupted so as to hold said feed-in roller at the pausing position.

3. The roller-guided feeding device of claim 2, wherein said servo valve assembly further includes a two-position second valve disposed downstream of said air pressure source and upstream of said first valve, and configured to be shifted in response to the start signal from said actuator from an on-communicating position, where supply of compressed air from said air pressure source to said first outlet port is cut off, to a communicating position, where the supply of compressed air to said first outlet port is resumed so as to shift said first valve to the first position, thereby moving said feed-in roller toward the first one of the initial positions, and a two-position third valve disposed downstream of said air pressure source and upstream of said first valve, and configured to be shifted to a communicating position in response to the work signal from said sensor member, where compressed air from said air pressure source is supplied to said second outlet port so as to shift said first valve to the second position to thereby move said feed-in roller toward the working position, and to be shifted to a non-communicating position, where supply of compressed air to said second outlet port is cut off, and which can be set in response to the pause signal.

4. The roller-guided feeding device of claim 3, wherein said servo valve assembly further includes a two-position fourth valve which is disposed downstream of said air pressure source and upstream of said third valve, and which is disposed downstream of said second valve to take up the compressed air therefrom, said fourth valve being configured to be shifted by the compressed air from said second valve from an open position, where supply of compressed air from said air pressure source through said third valve is maintained to thereby keep said first valve in the second position, to a closed position, where the supply of compressed air through said third valve is cut off so as not to alter state of said first valve which is in the first position.

5. The roller-guided feeding device of claim 2, wherein said servo valve assembly further includes two speed control members respectively disposed between said first outlet port and said rod-side pressure chamber and between said second outlet port and said head-side pressure chamber so as to control speed of flow of the compressed air into said rod-side pressure chamber and said head-side pressure chamber, respectively.

6. The roller-guided feeding device of claim 2, wherein said actuator includes a press plate which is mounted adjacent to said stationary support and which is manually operable so as to send the start signal to said second valve for shifting said second valve to the communicating position.

7. The roller-guided feeding device of claim 2, wherein said sensor member includes a contact plate which has a pivot end mounted on said stationary support and a contact end turnable to a pressed position in response to the starting of the feed-in course, and to a relieved position in response to the ending of the feed-out course of the workpiece, and a switch which is actuated by said contact end of said contact plate to send the work signal, which corresponds to the pressed position of said contact end, and the pause signal, which corresponds to the relieved position of said contact end.

* * * * *